(12) United States Patent
John et al.

(10) Patent No.: US 7,071,283 B2
(45) Date of Patent: Jul. 4, 2006

(54) REACTIVE RECTIFICATION

(75) Inventors: Gerald John, Baytown, TX (US);
Edmund Dikow, Köln (DE); Christine Mendoza-Frohn, Erkrath (DE); Georg Ronge, Düsseldorf (DE); Rolf Bachmann, Bergisch Gladbach (DE); Lutz Gottschalk, Uster (CH); Michael Prein, Brasschaat (BE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 10/344,965

(22) PCT Filed: Aug. 10, 2001

(86) PCT No.: PCT/EP01/09246
§ 371 (c)(1),
(2), (4) Date: Jun. 30, 2003

(87) PCT Pub. No.: WO02/16469
PCT Pub. Date: Feb. 28, 2002

(65) Prior Publication Data
US 2004/0039151 A1   Feb. 26, 2004

(30) Foreign Application Priority Data
Aug. 23, 2000 (DE) .................. 100 52 874

(51) Int. Cl.
*C08G 64/00* (2006.01)

(52) U.S. Cl. .................. 528/196; 428/131; 526/67; 526/68; 528/198

(58) Field of Classification Search .............. 526/67, 526/68; 528/196, 198; 422/131; 428/131
See application file for complete search history.

(56) References Cited

U.S. PATENT DOCUMENTS

| 4,436,894 A | * | 3/1984 | Urasaki et al. ............. 528/176 |
| 5,523,451 A | | 6/1996 | Rechner et al. ............ 558/270 |
| 5,739,258 A | | 4/1998 | Zaby et al. ................. 528/198 |
| 2003/0208027 A1 | * | 11/2003 | Brack et al. ................ 528/196 |

FOREIGN PATENT DOCUMENTS

| DE | 41 04 691 | 8/1992 |
| EP | 0 684 221 | 11/1995 |

OTHER PUBLICATIONS

Ullmann's Encyclopedia of Industrial Chemistry, Fifth Ed., vol. B4, pp. 321-328, VCH Publishers XP002184035 Seite 321, rechte Spalte -Seite 323, rechte Spalte, Zeile 9 Seite 327, linke Spalte, Absatz 2 -Seite 327, rechte Spalte.

* cited by examiner

*Primary Examiner*—Terressa Boykin
(74) *Attorney, Agent, or Firm*—Joseph C. Gil; Aron Preis

(57) ABSTRACT

The invention relates to a method for producing polycarbonate according to the method for the transesterification of molten mass whereby bis-(hydroxyaryl) compounds (bisphenols) and diaryl carbonates are reacted by means of reactive rectification.

2 Claims, 1 Drawing Sheet

REACTIVE RECTIFICATION

This application relates to a process for the production of polycarbonate by the melt transesterification process using reactive rectification.

Production of polycarbonates by melt transesterification proceeds by reacting bisphenols [bis(hydroxyaryl) compounds], preferably bisphenol A, with diaryl carbonates, preferably diphenyl carbonate, with elimination of the hydroxyaryl component from the carbonic acid diester; when diphenyl carbonate is used, phenol is eliminated. By sustained continuous or discontinuous removal of the hydroxyaryl component, for example phenol, the reaction equilibrium is shifted, making the formation of high molecular weight polycarbonates possible. A distinction is generally drawn in this connection between the so-called low viscosity stages at the beginning of the reaction, during which polycarbonate oligomers are formed and a large proportion of the liberated hydroxyaryl is separated and the so-called high viscosity stages, during which highly viscous polycarbonates are obtained towards the end of the reaction using special surface-forming apparatus. Separation of the hydroxyaryl in the low viscosity stages generally proceeds by distillation. It is known to use a stirred-tank reactor with an attached distillation column. The disadvantage of this method is that the process is performed batchwise and not by distillation and that the long residence times in the stirred-tank reactor may result in damage to the product. Alternatively, the hydroxyaryl may be separated in a multistage evaporator cascade, for example of falling film evaporators. Disadvantages of this continuous process are that, on flash evaporation in such apparatus, relatively large quantities of diphenyl carbonate are also removed by distillation from the reaction mixture and that the evaporator cascade entails considerable plant and equipment costs and complexity.

The object was therefore to provide a simpler process for the production of polycarbonate using the melt transesterification process by reacting diaryl carbonates (DAC) with bisphenols [bis(hydroxyaryl) compounds].

Figure 1:
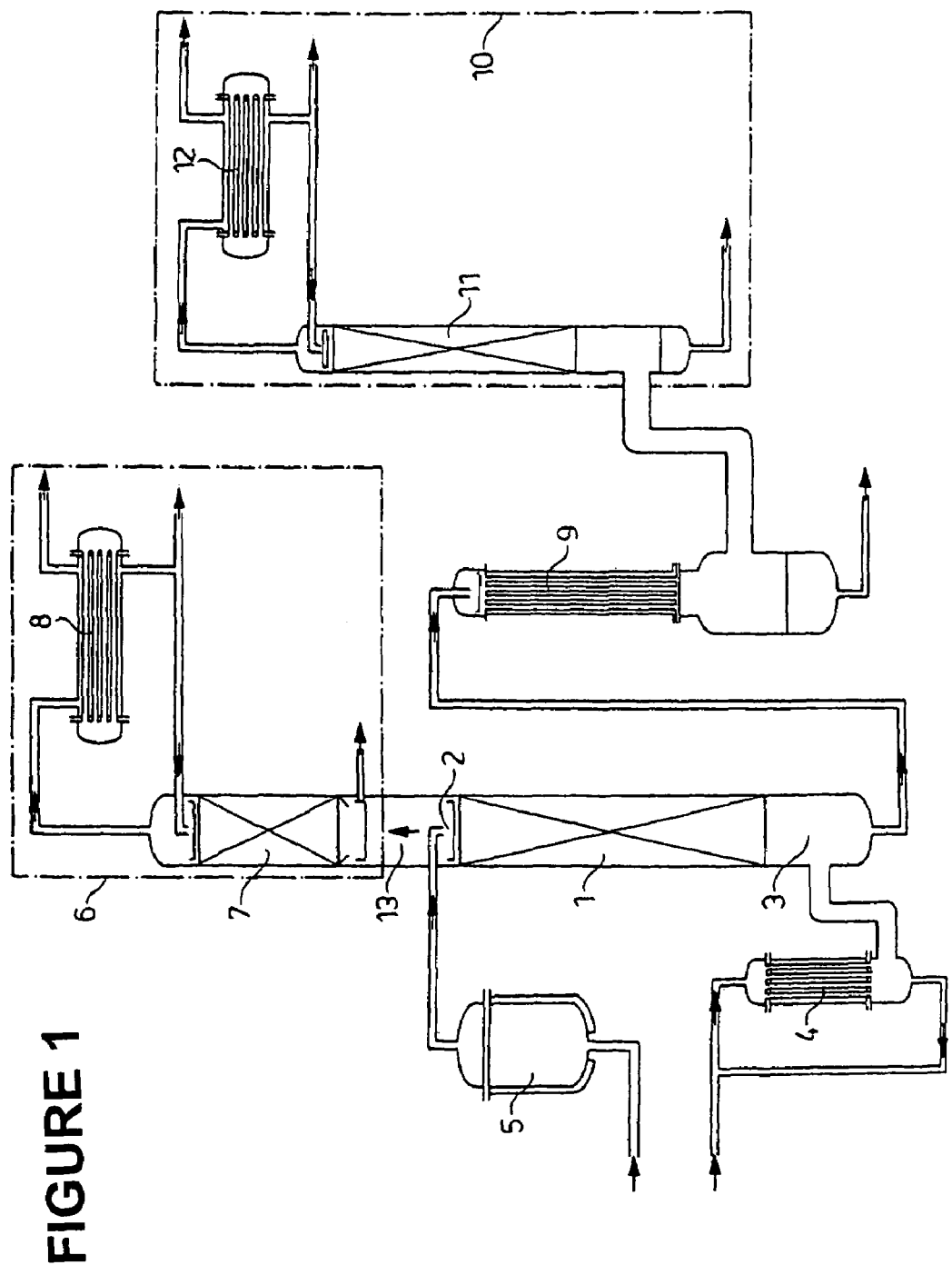
FIG. 1 is a flow diagram showing the inventive process.

It has now surprisingly been found that the low viscosity stage may be performed with reactive rectification reactors, in particular only one reactive rectification reactor. As a result it is possible to simplify the plant, to reduce residence times and consequently reduce product contamination by more effective removal of hydroxyaryl, to exercise greater control over product quality by means of the ratio of DAC introduced into a pre-reaction unit to DAC introduced in vapour form, and to reduce the excess of DAC in comparison with the falling film evaporator cascade, with a consequent reduction in circulating volumes.

The present invention accordingly provides a process for the production of polycarbonate oligomers by reacting bis(hydroxyaryl) compounds (bisphenols) and diaryl carbonates (DAC) with elimination of the hydroxyaryl component from the DAC and with introduction of pure DAC vapour countercurrently to this pre-reaction mixture. Preferred bisphenol components which are used individually or as mixtures are 2,2-bis(4-hydroxyphenyl)propane (BPA), 1,1-bis(4-hydroxyphenyl)3,3,5-trimethylcyclohexane, 4,4'-dihydroxybiphenyl or 1,3-bis(1-(4-hydroxyphenyl)1-methylethyl)benzene. BPA is particularly preferably used as the bisphenol component and diphenyl carbonate as the diaryl carbonate component.

The pre-reaction mixture is preferably introduced into the upper part (2) of a reaction unit (1) and the DAC vapour into the lower part (3) of the reaction unit (1).

The hydroxyaryl arising during the reaction of bis(hydroxyaryl) compounds with DAC is discharged from the reaction unit, preferably at the top (13) of the unit. The partial pressure of the hydroxyaryl in the DAC introduction section (3) is then zero. Since, in comparison with DAC, the corresponding hydroxyaryl is a low-boiling compound, it is displaced from the liquid phase by distillation and replaced by DAC from the vapour phase. As a result, in the preferred processing method, the vapour stream is continuously being concentrated from the bottom upwards with hydroxyaryl and DAC increasingly passes into the liquid phase, where it is available for the reaction. In the preferred embodiment, all the energy required for vaporising the hydroxyaryl formed in the column is introduced by the vapour-form DAC, i.e. thus by an evaporator (4), which does not come into contact with the polycarbonate. It is accordingly possible to dispense with any input of energy by hot evaporator surfaces which come directly into contact with the reaction product.

Pre-condensation is preferably performed in a separate pre-reaction unit (5). In this case, the pre-reaction unit is operated with a large DAC deficit and DAC is constantly resupplied by the vapour phase in the reactive rectification column. The hydroxyaryl formed in the pre-reaction unit may in part be vaporised by flashing off in the column or by partial vaporisation in the pre-reaction unit (5) itself.

Alternatively, it is, of course, possible to introduce additional energy into the column to ensure improved vaporisation of the hydroxyaryl or for control purposes by means of evaporator surfaces at the bottom of the column or heat exchangers in the column between the mass transfer elements.

Instead of introducing the entire quantity of DAC into the reaction zone from beneath, this stream may also be split and introduced in part at one or more points in the central portion of the reaction zone.

After this reactive rectification, in order to take the reaction to completion, a final falling film evaporator unit (9) is preferably connected downstream, which unit is operated at reduced pressure in comparison with the reactive column and has a separate condenser (12). It is, however, also possible to proceed without or with two or more evaporator units. In this case too, as described below for the column, an enrichment section (10), consisting of a condenser (12) and enrichment column (11) may optionally be operated in order to concentrate the secondary product vapour streams which arise.

The final falling film evaporator unit may, of course, also be operated at the same pressure as the reactive rectification column. In this case, it is possible to dispense with separate vapour condensation, as the vapours are introduced directly at the base of the reactive rectification.

It is entirely possible to utilise the enthalpy of the hydroxyaryl which leaves the top of the reactive column or the final falling film evaporator in vapour form for the purification thereof. In this case, savings are made with regard to additional energy and apparatus, for example, as described below:

The reactive rectification column is optionally operated with an enrichment section (6) to concentrate the escaping hydroxyaryl. At the top of the column, the hydroxyaryl is condensed in a condensing unit (8) and, on the basis of a reflux ratio selectable as a function of the required purity, partially discharged. As a result, the energy introduced with the DAC may be utilised not only for separating the hydroxyaryl but also for purifying it. The reflux is returned to the enrichment column (7). The liquid stream leaving the bottom of the enrichment section is discharged entirely or in part and may, optionally together with the condensed vapours from the final falling film evaporator, be sent for working-up in a separate, distinctly smaller quantity.

Alternatively, the vapours from the final falling film evaporator and the reactive column may be combined at the lower pressure level, i.e. in general at the pressure level of the final falling film evaporator. This combined vapour stream is introduced in vapour form into a separate working-up column. Under certain circumstances, the feed points for the individual vapour streams may be located at differing points on this working-up column.

If homogeneous catalysts are used, they are introduced entirely or in part into the pre-reaction unit. The remaining proportion is apportioned directly above or also at a lower point into the reaction section of the column. High-boiling or non-volatile catalysts are preferred as any transition into the gas phase may give rise to problems in the optionally installed distillative top section. Homogeneously dissolved catalysts which may be used are suitable soluble basic compounds, such as for example alkali metal or alkaline earth metal hydroxides or carbonates or basic organic compounds containing N or P. Basic quaternary ammonium or phosphonium salts are preferably used, such as for example tetraalkylammonium hydroxides or tetraarylphosphonium phenolates. Conventional mass transfer elements may here be used as column internals, wherein the intention is to ensure not only intensive mass transfer between the vapour and liquid but also a sufficiently long residence time for the reaction to proceed. Various column plates or ordered or random packings known to the person skilled in the art are thus suitable. Bubble or residence time trays and sheet metal packings may preferably be used in this case.

If solid catalysts are used, they are introduced in a manner known to the person skilled in the art into the mass transfer elements, such as for example in ordered or random catalytic packings with a fabric structure to accommodate heterogeneous catalysts or alternatively in specific apparatus in distillation trays. Examples of such column internals are described in patents EP-A 670 178; EP-A 461 855; U.S. Pat. No. 5,026,549; U.S. Pat. No. 4,536,373; WO 94/08681; WO 94/08682; EP-A 470 655; WO 97/26971; U.S. Pat. No. 5,308,451; EP-A 755 706; EP-A 781 829; EP-A 428 265; EP-A 448 884; EP-A 640 385; EP-A 631 813; WO 90/02603; WO 97/24174; EP-A 665 041; EP-A 458 472; EP-A 476 938.

Metal oxides or for example solid basic anion exchange resins may be used as the solid catalysts.

The temperature of the DAC supplied in vapour form is between the boiling point of the DAC at the prevailing column pressure and 300° C., particularly preferably up to 270° C.

The temperature of the mixture supplied in liquid form optionally from a pre-reaction unit is between 100 and 250° C., particularly preferably between 140 and 210° C.

The temperature in the column is established on the basis of the selected pressure and the selected feed conditions and is between 130 and 230° C. in the area of the liquid feed and between 180 and 270° C. in the lower zone of the column.

The temperature in the final falling film evaporator may be adjusted separately on the basis of the reduced pressure and is between 180° C. and 320° C., particularly preferably between 200 and 290° C.

The pressure established in the column at the upper end of the reaction section is between 20 and 500 mbar, particularly preferably between 30 and 200 mbar. The selected pressure has a particular impact upon the temperatures and thus upon the rate of reaction and product quality and, via the temperature, upon the viscosity and thus the fluid dynamics in the column.

The pressure established in the final falling film evaporator is determined in accordance with admissible temperatures for good product quality and is between 5 and 200 mbar, particularly preferably between 10 and 60 mbar.

The molar ratio of the total quantity of DAC introduced into the pre-reaction unit and the reactive column (i.e. in the pre-reaction unit and feed in vapour form) to the quantity of bis(hydroxyaryl) compounds is 0.95–1.5, particularly preferably 1.0–1.2.

0% to 60%, particularly preferably 2% to 30% of the entire DAC feed are introduced into the pre-reaction unit. The remainder is introduced into the column by the feed in vapour form. The instance with 0% DAC corresponds to a column without a pre-reaction unit, into which the preheated bis(hydroxyaryl) compound is introduced.

The greater part of the total amount of hydroxyaryl formed is flashed off in the column or stripped out by DAC in vapour form. The ratio of the hydroxyaryl stripped out in the final falling film evaporator to the total amount of hydroxyaryl formed is 0.1%–20%, particularly preferably 0.1%–10%.

Typical residence times in the pre-reaction unit are 1 min., to 60 min., particularly preferably 1 min. to 15 min.

Average residence times of the reaction mixture in the column are 3 min. to 80 min., particularly preferably 5 min. to 30 min.

Residence times in the final falling film evaporator including the associated pump receivers are 2 to 50 min., particularly preferably 5 to 25 min., In this manner, polycarbonate oligomers are obtained which exhibit a relative solvent viscosity $\text{eta}_{rel}$ (measured on a solution in dichloromethane containing 5 g of polymer per liter at 25° C.) of 1.05 to 1.10, preferably of 1.06 to 1.08. The content by weight of the phenolic OH terminal groups $x_{PhOH}$ in the resultant polycarbonate oligomers is 4000–10000 ppm, preferably 5000–7000 ppm. The products obtained in this manner may be used as prepolymers for the production of light-coloured and solvent-free polycarbonate, as for example described in EPA 719 814 or EPA 694572. To this end, the prepolymers, optionally with the addition of a suitable catalyst, are condensation polymerised with continued elimination of the hydroxyaryl compound from the diaryl components to yield high molecular weight polycarbonate polymers.

The following Example is intended to illustrate the present invention, but without restricting it.

EXAMPLE 24.2 kg/h of mixture prepared from 94.4 wt. % of BPA, 5.6 wt. % of DPC and, relative to BPA, $1.5 \cdot 10^{-3}$ mol % of tetraphenylphosphonium phenolate as catalyst are introduced into a pre-reaction unit and heated and, at 190° C., reacted in a pre-reaction to yield polycarbonate (PC). The residence time in the pre-reaction unit was approx. 3 min. The resultant phenol/BPA/DPC/PC mixture is introduced into the top of a reaction column. In so doing, a proportion of the hydroxyaryl formed in the pre-reaction unit flashes off. The temperature in the reaction column around the input point is approx. 190° C. Pure DPC is evaporated in a lateral falling film evaporator and, at a temperature of 230° C. at the base of the reaction column, introduced into the reaction column at an input rate of 22.7 kg/h.

The reaction column has a diameter of 100 mm and is equipped with a conventional 350 $m^2/m^3$ sheet metal packing. The total packing height is 13 m. The liquid is collected and redistributed at three points. The reaction column is insulated by an adiabatic jacket. The column is operated at 100 mbar. Pressure is measured directly above the reaction zone. Temperature measurement points are provided in the reaction column, measuring from the bottom upwards, after approx. 1.5 m and after 13 m of packing for monitoring the temperature profile. The temperature at the measuring point after 1.5 m is 232° C., that at the uppermost measuring point is 191° C. The residence time in the reaction column is approx. 10 minutes.

The reaction liquid is discharged from the reaction column at the bottom and introduced into a 1.0 $m^2$ falling film evaporator to take conversion to completion. The falling film evaporator and its bottom receiver are operated at 25 mbar and 272° C. 27.1 kg/h of liquid product consisting of polycarbonate oligomers may be withdrawn from the falling film evaporator. The product is characterised by the values $eta_{rel}$=1.063 and $x_{PhOH}$=6030 ppm. A total of 3.3 kg/h of vapour from the falling film evaporator, primarily consisting of DPC and phenol, are condensed in a separate condenser.

The vapour leaving the column is passed through an empty 1 m length of glass tube of a diameter of 100 mm to a condenser. The glass tube is also provided with an adiabatic jacket. 16.4 kg/h of vapour are condensed in the condenser installed thereover, which is operated at a coolant-side temperature of 50° C. The condensate contains approx. 98 wt. % phenol. In the laboratory, an enrichment section with mass transfer elements is not provided.

The invention claimed is:

1. A process for producing polycarbonate comprising:
    (i) forming in a pre-reaction unit a mixture containing a bis(hydroxyaryl) compound and a diaryl carbonate,
    (ii) introducing said mixture through the top of a reactive rectification column under condition calculated to bring about a reaction of said bis(hydroxyaryl) compound with said diaryl carbonate to yield hydroxyaryl,
    (iii) eliminating the hydroxyaryl obtained in (ii) and
    (iv) introducing diaryl carbonate in vapor form at the bottom of said reactive rectification column countercurrent to the pre-reaction mixture.

2. The process of claim 1 wherein the bis(hydroxyaryl) compound is bisphenol A and the diaryl carbonate is diphenyl carbonate.

* * * * *